(No Model.)
M. D. WOODRUFF.
GRAIN SEEDER.
No. 548,690. Patented Oct. 29, 1895.
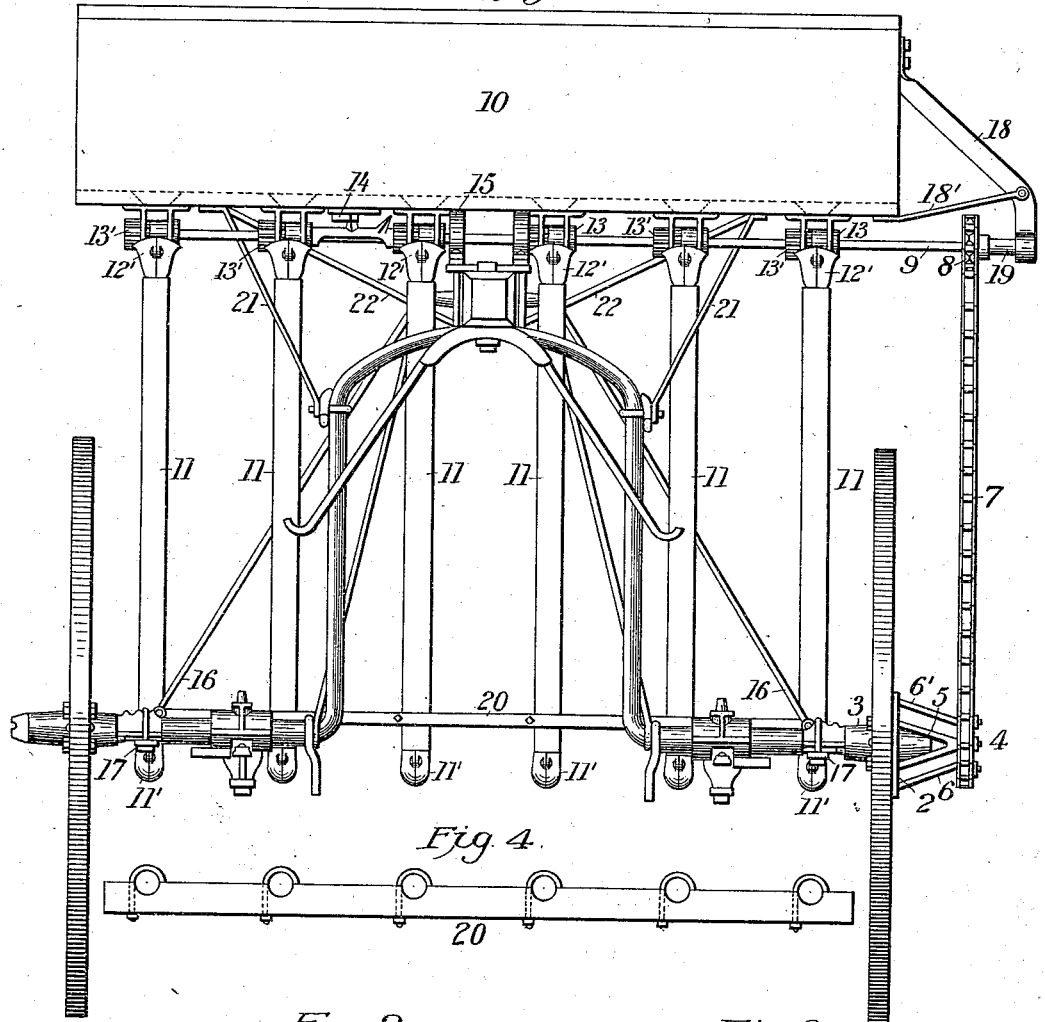
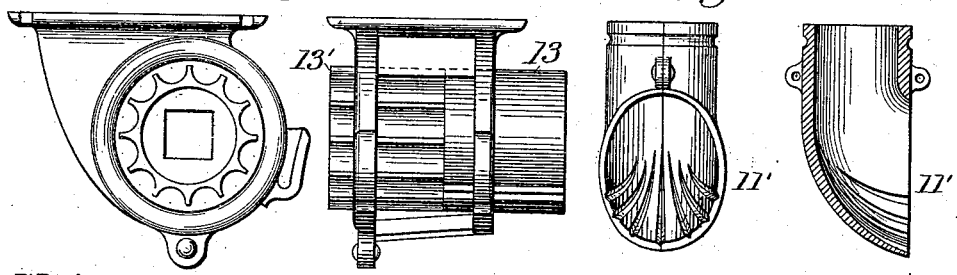
Witnesses.
Wm Hardin
Mary E. Jones
Inventor.
Marion D Woodruff

UNITED STATES PATENT OFFICE.

MARION D. WOODRUFF, OF LINCOLN, ILLINOIS.

GRAIN-SEEDER.

SPECIFICATION forming part of Letters Patent No. 548,690, dated October 29, 1895.

Application filed December 20, 1894. Serial No. 532,509. (No model.)

*To all whom it may concern:*

Be it known that I, MARION D. WOODRUFF, a citizen of the United States, residing at Lincoln, in the county of Logan and State of Illinois, have invented a certain new and useful Improvement in Grain-Seeders, of which the following is a description, reference being had to accompanying drawings, with numerals locating and explaining the different parts and forming part of this specification.

My invention has reference to devices for sowing small grain—such as oats, wheat, rye, barley, and other grains so constructed that it will sow the seed broadcast. It may be constructed in connection with or attached to a cultivator, and by using both in combination the seed will be sown and cultivated or mixed evenly with the soil at the same time.

In the drawings, Figure 1 is a rear view of the cultivator-frame with the seeding devices in operative position. Fig. 2 is a side and end view of the feed-cup and wheel, and Fig. 3 is an end and sectional view of the seed-scatterer.

Similar numerals of reference designate similar parts in the several views.

Around the hub of the cultivator-wheel are devices firmly secured to the cultivator-wheel, consisting of a metal rim 2, which, from the office it performs, may be called a "clutch-rim," the inner edge being in contact with the shoulders 3 of the hub in which the spokes of the wheel are inserted. The inner face of rim 2 presses against the spokes of the cultivator-wheel. Outwardly from rim 2 and upon the same parallel is a sprocket-wheel 4 of solid metal, the circumference being about the same as the inner edge of rim 2, the distance between said rim and sprocket-wheel being not less than three inches. Clutch-rim 2 and sprocket-wheel 4 are securely connected by a metal bar 5, each end divided, making it triangular in shape. Where the divided prongs meet each end of the outer division is bent to nearly a right angle inwardly, the flat outer surface bearing against the inner face of the sprocket-wheel 4, to which it is secured with bolts, each inserted through bar 5 and sprocket-wheel 4, with a nut upon the outer end. The inner divided ends of bar 5 are rounded and inserted, each through a perforation in clutch-rim 2.

Two metal rods 6 and 6', opposite each other, the inner end of each inserted through a perforation in clutch-rim 2 and curved around a spoke of the cultivator-wheel and the opposite end inserted through a perforation in sprocket-wheel 4, with a nut secured upon the end of each, firmly secures the parts of the device above described to the wheel of the cultivator, the sprocket-wheel being outward from the end of the hub.

A sprocket-chain 7 around sprocket-wheel 4 extends upwardly and around a smaller sprocket-wheel 8, secured upon the end of a small metal feed-bar 9, and controls and regulates the feeding apparatus of the device, which in their direct connection with the grain-box 10 and spouts 11 do not differ very materially from the mechanism already in use for those purposes.

Feed-bar 9 is square, its position being longitudinally under the middle of the grain-box. Apertures in the bottom of the grain-box, corresponding with the spouts in number and location, pass the seeds into a circular metal feed-cup secured to the bottom of the grain-box, through which they are conveyed into the mouth of the spout, being a metal receiver 12', around the lower end of which is secured the upper end of the rubber spout, stiff rubber being preferred for the spouts. Within said cups the feeding devices are operated, consisting of a cylindrical metal ring 13 and block 13', each in length corresponding with the width of said cup, ring 13 being secured to said cup by a groove in the cup, and a corresponding wing upon the outer surface of the ring inserted therein. Block 13' is by a square socket firmly secured to feed-bar 9. The surface of block 13' is furrowed for the purpose of passing the grain from the feed-box through said cups into the spout, the quantity being controlled by a sliding gage between said cups and operated by a handle attachment 14 to the under surface of the feed-box and also to said gage.

Upon the inner end of ring 13 is a narrow circular shoulder, around which the contiguous end of block 13' revolves. Upon the outer end is a ring confined within the wall of said cup, but revolving with block 13, the inner surface having projections corresponding with said furrows and fitting into them, thus preventing the escape of grain.

The grain-box is very firmly secured upon the tongue of the cultivator, elevated slightly above the tongue and supported by metal bars 15 attached to the bottom of the box crosswise, the ends bent downwardly to the tongue, thence outwardly, and firmly secured with bolts to other short bars across said tongue above and below it.

The end of feed-bar 9 extending outwardly beyond sprocket-wheel 8 and also the grain-box connected with it are firmly held in position by braces, one 18 consisting of a bar, preferably of malleable iron, the lower end having a circular orifice fitting loosely around a metal block 19, secured upon the end of feed-bar 9, in which block 19 revolves, thence extending vertically upward about two inches, at which point it divides into two prongs, each bent inwardly at an angle of about forty degrees above a horizontal line and securely bolted to the end of the grain-box 10. This brace is supplemented by an additional one, consisting of two similar parallel rods 18', the rear end of each secured to the bottom of the grain-box, the opposite ends secured together by a bolt inserted through them and also through brace-bar 18 between them.

Additional supports to the grain-box and feed-bar 9 connected therewith consist of two similar rods 21, one on each side, the lower end of each secured by a clip attachment to the cultivator-axle, where its upper curve commences, the upper end to the bottom of the grain-box, and further by two additional and similar rods 22, one on each side, the lower end of each secured to the outer lower corner of the cultivator-tongue, the upper end secured to the bottom of the grain-box.

Spouts 11 are separated about seven inches, the lower ends being about twelve inches above ground, having each a metal termination 11' pointing forwardly, around which the lower end of the rubber spout is secured, the inner concave surface of said termination furrowed in such manner as to scatter the grain evenly in front and laterally. The spouts descend perpendicularly, or nearly so, in front of the cultivator-axle. In order to secure each in its proper position, I use a small bar 20 across the structure, the ends secured each to a rod of the cultivator 16; the lower end 17 of which is curved around the axle in close proximity to the hub of the cultivator-wheel, the front edge of rod 20 being contiguous to said spouts 11, to which they are confined with wires through perforations in said bar and around said spouts, in such manner as may be most convenient.

I use this device only in connection with a cultivator and for broadcast-sowing. Shovels (not shown in the drawings) for pulverizing and mixing the grain with the soil are attached in the usual manner.

The inner edge of clutch-rim 2, in its entire circumference resting upon the projecting shoulders of the hub in connection with bar 5, and also rods 6 and 6', each very tightly curved around a spoke of the wheel, gives to that part of the device a rigidity equal to that of an enlarged hub. It places the sprocket-chain so far outwardly from the cultivator-wheel as to avoid contact with mud or any obstruction from its rim. The moving of the cultivator operates the entire device by means of the sprocket chain and wheels.

By the use of the sliding gage 14 the feeding device is set to furnish with exactness the quantity of grain required for a given amount of soil-surface. Grain is sown and cultivated by one operation, thus dispensing with half the labor and time heretofore given to that work. It is specially useful in the sowing of oats, which are invariably sown broadcast.

Having described my invention and explained its operation, what I claim as new and useful, and desire to secure by Letters Patent, is—

In an attachment for cultivators, the clutch, composed of the following parts, viz, rim 2, bars 5, rods 6, and 6', and sprocket wheel 4, secured to one of the bearing wheels; in combination with the chain 7, sprocket wheel 8, secured on feed shaft 9: braces 18, and 18', 21, and 22, and the feed spout 11, and scatterer 11', substantially as shown and described.

MARION D. WOODRUFF.

Witnesses:
E. G. KING,
ROBERT HUMPHREY.